(12) United States Patent  
Sanchez et al.

(10) Patent No.: US 10,955,005 B2
(45) Date of Patent: Mar. 23, 2021

(54) CARDAN UNIVERSAL JOINT SEAL WITH RADIALLY EXTENDING LIPS

(71) Applicant: NEAPCO INTELLECTUAL PROPERTY HOLDINGS, LLC, Farmington Hills, MI (US)

(72) Inventors: Victor S. Sanchez, Warren, MI (US); Robert J. Wehner, Livonia, MI (US)

(73) Assignee: NEAPCO INTELLECTUAL PROPERTY HOLDINGS, LLC, Farmington Hills, MI (US)

( * ) Notice: Subject to any disclaimer, the term of this patent is extended or adjusted under 35 U.S.C. 154(b) by 387 days.

(21) Appl. No.: 16/004,581

(22) Filed: Jun. 11, 2018

(65) Prior Publication Data

US 2018/0363708 A1 Dec. 20, 2018

Related U.S. Application Data

(60) Provisional application No. 62/521,630, filed on Jun. 19, 2017.

(51) Int. Cl.
| | |
|---|---|
| *F16C 33/78* | (2006.01) |
| *F16C 33/72* | (2006.01) |
| *F16D 3/38* | (2006.01) |
| *F16D 3/41* | (2006.01) |
| *F16C 21/00* | (2006.01) |

(52) U.S. Cl.
CPC ........ *F16C 33/7876* (2013.01); *F16C 33/723* (2013.01); *F16C 33/7809* (2013.01); *F16C 33/7823* (2013.01); *F16D 3/385* (2013.01); *F16C 21/005* (2013.01); *F16C 2361/41* (2013.01); *F16D 3/41* (2013.01); *F16D 2300/08* (2013.01)

(58) Field of Classification Search
CPC ........................ F16C 33/7876; F16C 33/7823; F16C 33/723; F16C 33/7809; F16C 2361/41; F16C 21/005; F16D 3/385; F16D 2300/08; F16D 3/41; F16J 15/3232
USPC .................................. 464/131, 133; 277/565
See application file for complete search history.

(56) References Cited

U.S. PATENT DOCUMENTS

| | | | | |
|---|---|---|---|---|
| 5,503,408 | A * | 4/1996 | Hemann | F16J 15/3232 |
| | | | | 277/565 |
| 5,716,277 | A | 2/1998 | Reynolds | |
| 7,736,238 | B2 * | 6/2010 | Kurzeja | F16C 17/18 |
| 8,196,932 | B2 * | 6/2012 | Kobayashi | F16C 33/7809 |

(Continued)

FOREIGN PATENT DOCUMENTS

| | | |
|---|---|---|
| CN | 2464986 Y | 12/2001 |
| CN | 2648167 Y | 10/2004 |
| CN | 202125529 U | 1/2012 |

(Continued)

*Primary Examiner* — Greg Binda
(74) *Attorney, Agent, or Firm* — Shumaker, Loop & Kendrick, LLP; James D. Miller

(57) ABSTRACT

A seal for sealing between a trunnion and bearing cup of a joint member includes a main annular body. A plurality of annular lips extend radially inwardly from the main body. The lips are configured for engaging an outer bearing surface of the trunnion. A first one and a second one of the lips slope in a first direction with respect to the outer bearing surface of the trunnion and a third one of the lips slope in a second direction with respect to the outer bearing surface of the trunnion.

19 Claims, 3 Drawing Sheets

(56) References Cited

U.S. PATENT DOCUMENTS 9,695,881 B1 * 7/2017 Garner ................ F16C 33/7826
10,309,465 B2 * 6/2019 Tate .................... F16C 33/7876

FOREIGN PATENT DOCUMENTS

CN        104379952 A    2/2015
JP       2005030524 A    2/2005

* cited by examiner

CARDAN UNIVERSAL JOINT SEAL WITH RADIALLY EXTENDING LIPS

CROSS-REFERENCE TO RELATED APPLICATIONS

This patent application claims the benefit of U.S. Provisional Patent Application Ser. No. 62/521,630, filed on Jun. 19, 2017. The entire disclosure of the above patent application is hereby incorporated herein by reference.

FIELD

The present invention relates to universal joints and more particularly to a seal geometry of a seal positioned within a bearing cup of the universal joint.

BACKGROUND OF THE INVENTION

Joint assemblies such as universal joints are common components in automotive vehicles for applications requiring a transmission of torque. Joint assemblies typically include a body portion with a plurality of trunnions extending radially outwardly therefrom. A hollow cylindrical bearing cup is rotatably disposed about the distal ends of each of the trunnions. Roller bearings are disposed within the bearing cup and permit the rotation of the bearing cup about the trunnions. The trunnions may have central bores wherein a fluid such as a lubricant is disposed during assembly to lubricate the roller bearings during operation.

As is known, a seal is typically positioned between the outer surface of the trunnion and an inner surface of the bearing cup to form a seal therebetween. To provide an effective seal, the seal must prevent contaminants from entering into the bearing cups and restrict a flow of the fluid out of the area of the bearing cup where the roller bearings are located. A lip seal is typically employed to accomplish effective sealing.

The lip seal includes a plurality of lips that extend radially inwardly towards the outer surface of the trunnion in a direction away from the roller bearings. The geometry of the seal militates against entry of contaminants to the bearing cup. Another advantage of the geometry of the seal is the contact pressure of the lips against the trunnions is relieved as pressure builds up within the joint during high temperature operations. The relief of the pressure allows trace amounts of fluid to flow under the lips of the seal, thereby improving the lubrication of the lips and minimizing wear to the seal. However, it has been found that universal joints exposed to very high underbody temperatures may allow too much fluid to flow under the lips, resulting in a visible fluid trail that may be undesirable.

An example of a joint assembly and seal is shown and described in U.S. Pat. No. 5,716,277, the disclosure of which is hereby incorporated herein by reference in its entirety. The seal in U.S. Pat. No. 5,716,277 includes an inner lip extending towards the roller bearing and two additional lips extending away from the roller bearings. The geometry and arrangement of the lips effectively prevents fluid loss past the inner lip, but creates potential for accelerated wear on all three seal lips because outward flow of the fluid for lubrication of the outer seal lips is limited by the innermost lip (i.e. the lip closest to the roller bearings).

It is desired to include a seal for a universal joint that maintains a flow of a fluid to a desired one of the lips of the seal, minimizes wear, and effectively militates against fluid loss during high temperature operations.

SUMMARY OF THE INVENTION

In accordance and attuned with the present invention, a universal joint that maintains a flow of a fluid to a desired one of the lips of the seal, minimizes wear, and effectively militates against fluid loss during high temperature operations, has surprisingly been discovered.

According to an embodiment of the disclosure, a seal for sealing between a trunnion and bearing cup of a joint member is disclosed. The seal includes an annular main body. A plurality of annular lips extend radially inwardly from the main body and engage an outer bearing surface of the trunnion. A first one of the lips and a second one of the lips slope in a first direction with respect to the outer bearing surface of the trunnion and a third one of the lips slopes in a second direction with respect to the outer bearing surface of the trunnion.

According to another embodiment of the disclosure, a joint member is disclosed including a plurality of trunnions and a plurality of roller bearings. Each of the roller bearings is disposed about each of the trunnions. A plurality of bearing cups, each of the bearing cups disposed about each the trunnions and each the roller bearings. The bearing cups having a closed end and an open end. A plurality of annular seal assemblies are included. Each of the seal assemblies is disposed in each of the bearing cups and coaxially received about each of the trunnions and disposed intermediate each of the roller bearings and the open end of each of the bearing cups. Each of the seal assemblies includes a seal with a seal body and a pair of lips extending radially inwardly from the seal body. A first one of the lips is disposed adjacent each of the roller bearings and slopes in a direction from the seal body towards the open end of each of the bearing cups se A second one of the lips is disposed intermediate the open end of each of the bearing cups and the first one of the lips and slopes in a direction from the seal body towards the closed end of each of the bearing cups.

According to yet another embodiment of the disclosure, a joint member is disclosed. The joint member including a central body and a plurality of trunnions. Each of the trunnions extending radially outwardly from the central body. A plurality of bearing cups are also included. Each of the bearing cups having an open end and a closed end. The open end of each of the bearing cups receiving one of the trunnions. A plurality of needle roller bearings are also included. Each of the roller bearings disposed in each of the bearing cups and received about a respective one of the trunnions. A plurality of annular seals each disposed in one of the bearing cups and about the respective one of the trunnions. Each of the seals disposed intermediate the open end of a respective one of the bearing cups and a respective one of the roller bearings with respect to an axial direction of each of the bearing cups. The joint member further including a plurality of lips extending radially inwardly from each of the seals. A first one of the lips, a second one of the lips, and a third one of the lips slope in a first direction with respect to an axial direction of the respective one of the bearing cups and a fourth one of the lips slopes in a second direction with respect to the axial direction of the respective one of the bearing cups.

BRIEF DESCRIPTION OF THE DRAWINGS

The above advantages of the invention will become readily apparent to those skilled in the art from reading the following detailed description of an embodiment of the invention in the light of the accompanying drawings which.

DETAILED DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical. As used herein, the term "substantially" means "mostly, but not perfectly" or "approximately" as a person skilled in the art would recognize in view of the specification and drawings.

Figure 1:
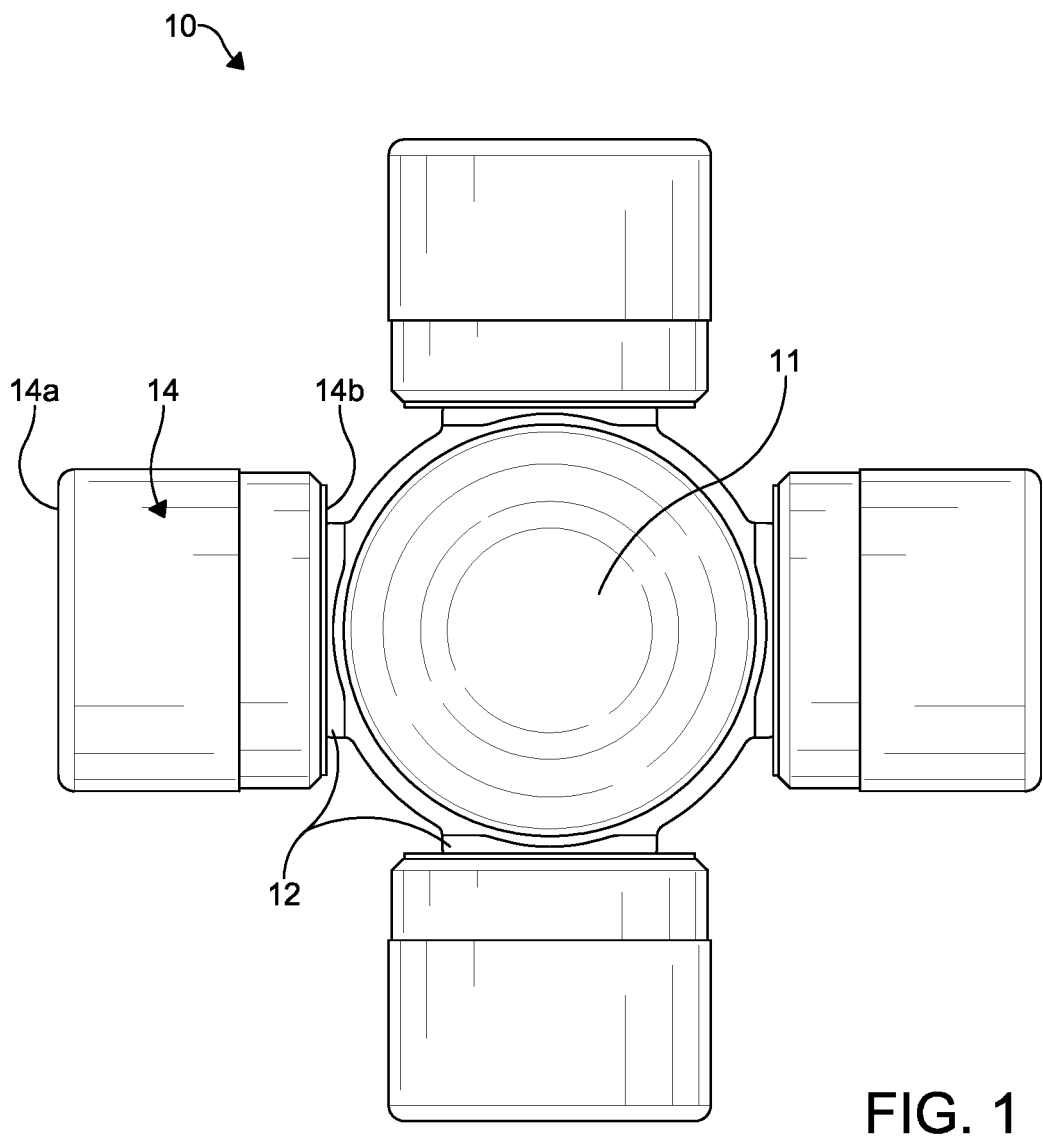
FIG. 1 a front elevational view of a joint member according to an embodiment of the invention.

FIG. 1 shows a joint member 10 of a joint assembly such as a universal joint assembly, for example. The joint assembly is configured to facilitate a transmission of rotational forces and torque between components of a vehicle. An example of a joint assembly is disclosed in U.S. Pat. No. 5,716,277, the entire disclosure of which is hereby incorporated herein by reference. The joint member 10 includes a central body 11 including a plurality of cylindrically-shaped cross journals or trunnions 12 and a plurality of bearing cups 14. The trunnions 12 extend radially outwardly from the body 11 and are integrally formed with the body 11. Although, in other embodiments, the trunnions 12 can be separately formed from the body 11 and coupled to the body 11. The bearing cups 14 are rotatably disposed about distal ends 15 of the trunnions 12. In the embodiment illustrated, the joint member 10 is configured as a substantially cross-shaped member including four of the trunnions 12 and four of the bearing cups 14. However, it is understood the joint member 10 can include more or fewer than four trunnions and bearing cups without departing from the scope of the disclosure.

Figure 2:
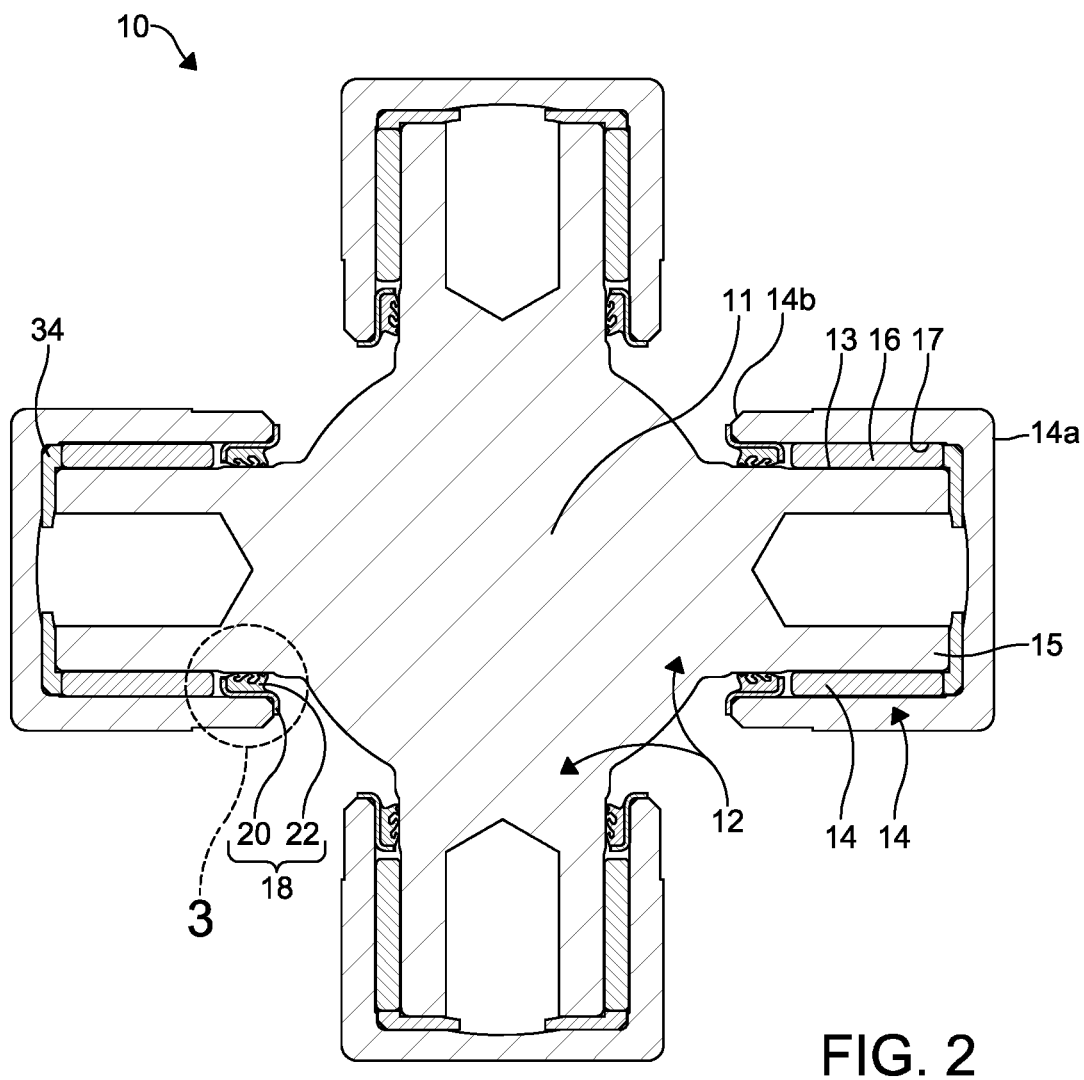
FIG. 2 is a cross-sectional front elevational view of the joint member of FIG. 1, taken along a horizontal line extending through a center of the joint member.
Figure 3:
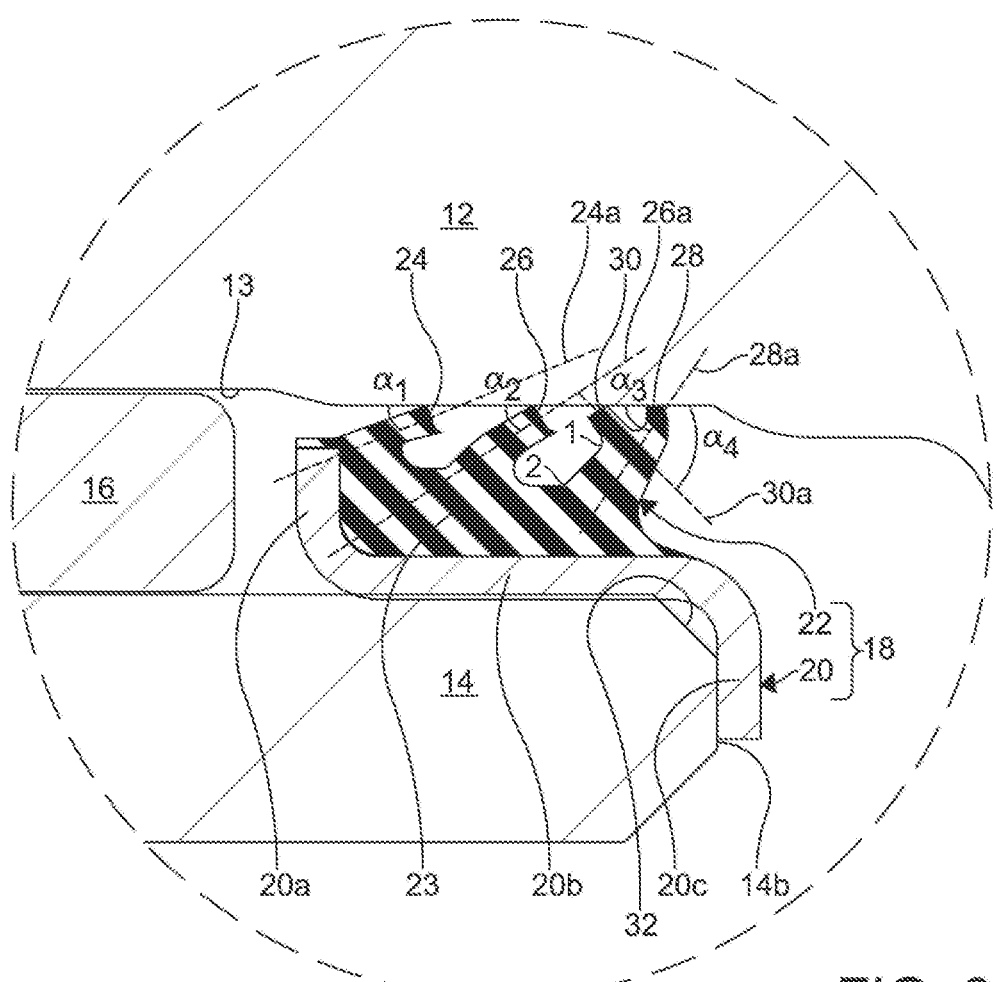
FIG. 3 is an enlarged fragmentary cross-sectional front elevational elevational view of the joint member of FIG. 2, highlighted by circle 3, illustrating a portion of a trunnion, a bearing cup, a needle roller bearing, and a seal assembly.

As shown in FIGS. 2-3, each of the bearing cups 14 is substantially cylindrical having a closed end 14a and an open end 14b. The open end 14b receives the distal end 15 of a corresponding one of the trunnions 12, wherein the bearing cup 14 is coaxially disposed about the trunnion 12. A plurality of needle roller bearings 16 (only two are illustrated about each of the trunnions 12) is disposed annularly about each of the trunnions 12 and within each of the bearing cups 14 intermediate an outer bearing surface 13 of the trunnion 12 and an inner bearing surface 17 of the bearing cup 14. The bearings 16 allow the bearing cups 14 to rotate about the outer bearing surface 13 of the trunnions 12.

An annular seal assembly 18 is positioned adjacent the open end 14b of the bearing cup 14 intermediate the outer bearing surface 13 of the trunnion 12 and the inner bearing surface 17 of the bearing cup 14. The seal assembly 18 is also positioned adjacent the bearings 16, wherein the bearings 16 are disposed intermediate the closed end 14a of the bearing cup 14 and the seal assembly 18 with respect to an axial direction of the bearing cup 14. The seal assembly 18 includes a support ring 20 and a seal 22. The support ring 20 is generally S-shaped in cross-section having a substantially radially inwardly extending portion 20a, a substantially cylindrical central portion 20b, and a substantially radially outwardly extending portion 20c. The seal 22 is coupled to the support ring 20 by any conventional means such as adhesive bonding, a friction fit, and the like, for example. In the embodiment shown, the support ring 20 is metallic and the seal 22 is elastomeric. Although, it is understood the support ring 20 and the seal 22 can be formed from alternate materials, if desired.

The seal 22 includes a substantially annular main seal body 23 sloping gradually from the closed end 14a of the bearing cup 14 to the open end 14b of the bearing cup14, a substantially annular first lip 24, a substantially annular second lip 26, a substantially annular third lip 28, and a substantially annular fourth lip 30. Each of the first lip 24, the second lip 26, and the third lip 28 extends substantially radially inwardly directly from the seal body 23 towards the outer bearing surface 13 of the trunnion 12 when the joint member 10 is assembled. The fourth lip 30 extends substantially radially inwardly from the third lip 28 towards the outer bearing surface 13 of the trunnion 12 when the joint member 10 is assembled. As shown in FIG. 3, the fourth lip 30 branches away from the third lip 28 at a first position 1 and the third lip 28 branches away from the main seal body 23 at a second position 2, wherein the first position 1 is spaced apart from and disposed radially inwardly of the second position 2. However, it is understood, the fourth lip 30 can extend directly from the seal body 23. The first lip 24 is disposed adjacent the bearings 16, the second lip 26 is disposed intermediate the first lip 24 and the third lip 28, and the fourth lip 30 is disposed intermediate the second lip 26 and the third lip 28.

Each of the lips 24, 26, 28, 30 is generally oriented along lines 24a, 26a, 28a, 30a forming acute angles with respect to an axial direction of the seal 22, designated as a first lip angle $\alpha_1$, a second lip angle $\alpha_2$, a third lip angle $\alpha_3$, and a fourth lip angle $\alpha_4$, respectively, with the outer bearing surface 13 of the trunnion 12. The first lip 24, the second lip 26, and the third lip 28 are sloped or extend in a direction from the seal body 23 towards the open end 14b of the bearing cup 14 or away from the bearings 16. The fourth lip 30 is sloped or extends in a direction from the seal body 23 towards the bearings 16 or away from the open end 14b of the bearing cup 14.

The radially inwardly extending portion 20a of the support ring 20 is disposed intermediate the seal body 23 and the bearings 16. The cylindrical central portion 20b of the support ring 20 is disposed intermediate the seal body 23 and the inner bearing surface 17 of the bearing cup 14. The radially outwardly extending portion 20c is disposed adjacent the open end 14b of the bearing cup 14. In certain embodiments, as shown, a chamfer 32 is formed at a radial inner edge of the open end 14b of the bearing cup 14. According to this embodiment, the radially outwardly extending portion 20c of the support ring 20 overlaps the chamfer 32 but does not engage the chamfer 32.

It is understood the joint member 10 may include other components typically included with joint members 10 such as joint members for a universal joint. For example, the joint member 10 can include a washer or a spacer 34, additional seals (not shown), clips (not shown), or dust covers (not shown).

Advantageously, the direction of the first lip 24 and the second lip 26, which are the innermost lips with respect to the closed end 14a of the bearing cup 14, militates against inward contaminant flow while also permitting a fluid such as a lubricant to flow past the first lip 24 and the second lip 26. Because the first lip 24 and the second lip 26 do not restrict flow of the fluid, the first lip 24 and the second lip 26 are not subject to wear because of the presence of the fluid.

Advantageously, the fourth lip 30 militates against an outward flow of the fluid from the bearing cup 14, while the third lip 28 advantageously militates against inward contamination during operations affecting internal temperature or pressure drop. The direction of the fourth lip 30 points towards the roller bearing 16 so that during high temperature operations, when the contact pressure of the first lip 24, the second lip 26, and the third lip 28 are potentially reduced as a result of increasing pressure within the bearing cup 14, the fourth lip 30 still militates against contamination and fluid leakage.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A seal for sealing between a trunnion and bearing cup of a joint member comprising:
    an annular main body;
    a plurality of annular lips extending radially inwardly from the main body and engaging an outer bearing surface of the trunnion, a first one of the lips and a second one of the lips slope in a first direction with respect to the outer bearing surface of the trunnion and a third one of the lips slopes in a second direction with respect to the outer bearing surface of the trunnion, wherein the third one of the lips branches from the second one of the lips at a first position and the second one of the lips branches from the main body at a second position, wherein the first position is spaced apart from and disposed radially inwardly of the second position.

2. The seal of claim 1, wherein the seal is formed from an elastomeric material.

3. A joint member comprising:
    a plurality of trunnions;
    a plurality of roller bearings, each of the roller bearings disposed about each of the trunnions;
    a plurality of bearing cups, each of the bearing cups disposed about each the trunnions and each the roller bearings, the bearing cups having a closed end and an open end; and
    a plurality of annular seal assemblies, each of the seal assemblies disposed in each of the bearing cups and coaxially received about each of the trunnions and disposed intermediate each of the roller bearings and the open end of each of the bearing cups, each of the seal assemblies including a seal with a seal body and a pair of lips extending radially inwardly from the seal body, a first one of the lips is disposed adjacent each of the roller bearings and slopes in a direction from the seal body towards the open end of each of the bearing cups, a second one of the lips is disposed intermediate the open end of each of the bearing cups and the first one of the lips and slopes in a direction from the seal body towards the closed end of each of the bearing cups.

4. The joint member of claim 3, wherein each of the seal assemblies further comprises a support ring disposed intermediate each of the bearing cups and the seal.

5. The joint member of claim 4, wherein the support ring is substantially S— shaped in cross-section and includes a radially inwardly extending portion, a cylindrical central portion, and a radially outwardly extending portion.

6. The joint member of claim 4, wherein the support ring is a metal and the seal is an elastomer.

7. The joint member of claim 3, wherein each of the lips engages an outer bearing surface of each of the trunnions.

8. The joint member of claim 3, wherein the seal includes three lips, a third one of the lips disposed intermediate the second one of the lips and the open end of each of the bearing cups.

9. The joint member of claim 8, wherein the seal includes four lips, a fourth one of the lips disposed intermediate the first one of the lips and the second one of the lips.

10. The joint member of claim 9, wherein the third one of the lips and the fourth one of the lips slope in a direction from the seal body towards the open end of each of the bearing cups.

11. The joint member of claim 3, wherein the seal body tapers along an axial direction of the bearing cup from the closed end of each of the bearing cups and the open end of each of the bearings cups.

12. The joint member of claim 3, wherein the open end of the bearing cup includes a chamfer formed on a radial inner edge thereof.

13. The joint member of claim 3, wherein each of the seal assemblies is disposed intermediate the open end of each of the bearing cups and each of the roller bearings.

14. A joint member comprising:
    a central body;
    a plurality of trunnions, each of the trunnions extending radially outwardly from the central body;
    a plurality of bearing cups, each of the bearing cups having an open end and a closed end, the open end of each of the bearing cups receiving one of the trunnions;
    a plurality of needle roller bearings, each of the roller bearings disposed in each of the bearing cups and received about a respective one of the trunnions;
    a plurality of annular seals, each of the seals disposed in one of the bearing cups and about the respective one of the trunnions, each of the seals disposed intermediate the open end of a respective one of the bearing cups and a respective one of the roller bearings with respect to an axial direction of each of the bearing cups; and
    a plurality of lips extending radially inwardly from each of the seals, a first one of the lips, a second one of the lips, and a third one of the lips slope in a first direction with respect to an axial direction of the respective one of the bearing cups and a fourth one of the lips slopes in a second direction with respect to the axial direction of the respective one of the bearing cups.

15. The joint member of claim 14, wherein a support ring is coupled to each of the seals and disposed intermediate an inner bearing surface of the respective one of the bearing cups and the outer bearing surface of the respective one of the trunnions.

16. The joint member of claim 14, wherein each of the third one of the lips is disposed adjacent the open end of the respective one of the bearing cups.

17. The joint member of claim 16, wherein each of the fourth one of the lips extends from a respective one of the third one of the lips.

18. The joint member of claim 17, wherein each of the second one of the lips is disposed intermediate the first ones of the lips and the fourth one of the lips.

19. The joint member of claim 14, wherein each of the lips engages the outer bearing surface of the respective one of the trunnions.

\* \* \* \* \*